(12) United States Patent
Yoneyama (10) Patent No.: US 6,313,955 B1
(45) Date of Patent: Nov. 6, 2001

(54) REAR-FOCUSING TELEPHOTO LENS SYSTEM

(75) Inventor: Shuji Yoneyama, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/577,161

(22) Filed: May 24, 2000

(30) Foreign Application Priority Data

May 25, 1999 (JP) .................................................. 11-144821

(51) Int. Cl.$^7$ .......................... G02B 15/14; G02B 13/02; G02B 9/06

(52) U.S. Cl. .......................... 359/684; 359/691; 359/745; 359/794

(58) Field of Search .................................... 359/684, 689, 359/691, 745, 784, 794

(56) References Cited

U.S. PATENT DOCUMENTS

| | | | |
|---|---|---|---|
| 4,426,137 | 1/1984 | Mori | 359/778 |
| 4,575,198 | 3/1986 | Tanaka | 359/745 |
| 4,812,027 | 3/1989 | Yanagisawa | 359/755 |
| 5,172,274 | 12/1992 | Hirakawa | 359/745 |
| 5,627,686 | 5/1997 | Ohshita | 359/684 |
| 5,640,277 | 6/1997 | Ohshita | 359/684 |
| 5,793,536 | * 8/1998 | Sato | 359/691 |

FOREIGN PATENT DOCUMENTS

| | | |
|---|---|---|
| 58199311 | 11/1983 | (JP) . |
| 60166912 | 8/1985 | (JP) . |
| 60201313 | 10/1985 | (JP) . |

\* cited by examiner

*Primary Examiner*—Georgia Epps
*Assistant Examiner*—Michael A. Lucas
(74) *Attorney, Agent, or Firm*—Greenblum & Bernstein, P.L.C.

(57) ABSTRACT

A rear-focusing telephoto lens system includes a positive front lens group, and a positive rear lens group, in this order from the object The front lens group includes at least two positive lens elements, each of which has a large-curvature convex surface facing toward the object, and a negative lens element having a large-curvature concave surface facing toward the image. The rear lens group includes at least one lens element which has a convex surface facing toward the object, and is positioned at the most object-side in the rear lens group. Upon focusing, only the rear lens group moves along the optical axis, and the lens system satisfies the following condition:

$$0.5 < f/fF < 0.8 \quad (1)$$

wherein
 f designates the focal length of the entire lens system; and
 fF designates the focal length of the front lens group.

4 Claims, 13 Drawing Sheets

REAR-FOCUSING TELEPHOTO LENS SYSTEM

BACKGROUND OF THE INVENTION

1. Field of the Invention

The present invention relates to a rear-focusing telephoto lens system which is used in a single lens reflex (SLR) camera, a video camera and the like.

2. Description of the Related Art

In a telephoto lens system having a smaller F-number of 2.8 or less and an angle-of-view of about 26°, the number of lens elements tends to be larger due to a smaller F-number, the overall length thereof becomes longer due to being a telephoto lens system, and further the diameter of lens elements tends to be larger due to an angle-of-view of 26° which is relatively wider for a telephoto lens system. Consequently, the weight of the lens system also tends to be heavier.

On the other hand, an auto-focusing (AF) camera is required to have a lighter (less heavier) lens group to be moved upon focusing (hereinafter, a focusing lens group) in order to attain quick movement of the focusing lens group and to reduce a load imposed on a power source. For the purpose of satisfying these requirements, a lens system, such as rear-focusing and inner-focusing type lens systems, in which a part of lens groups is arranged to be moved for focusing, is employed. In this regard, a rear-focusing type lens system is suitable for a lens system having a relatively larger angle-of-view, while an inner-focusing type lens system is not.

Various rear-focusing telephoto lens systems are taught, for example, in the U.S. Pat. No. 4,426,137, the Japanese Unexamined Patent Publication (JPUEPP) No. Sho-58-199311, JPUEPP Sho-60-166912, JPUEPP Sho-60-201313, and U.S. Pat. No. 4,812,027. However, in these lens systems, the rear lens group in a Gauss type lens system is made movable as a focusing lens group. Upon the rear lens group being moved, a height of incidence on a large-curvature concave surface of the object-side surface of the rear lens group varies, and an angle of incidence varies accordingly, so that fluctuation of spherical aberration becomes larger.

As an improved type of the above described lens systems, in U.S. Pat. No. 5,172,274, the applicant of the present invention has disclosed a telephoto lens system. This telephoto lens system has acceptable optical performance; however, an aperture stop is provided in the rear lens group (focusing lens group), because the distance between the front and rear lens groups is shorter upon photographing an object at a closer photographing distance. An arrangement in which the aperture stop with a variable aperture moves upon focusing makes the structure of a lens barrel complicated. Furthermore, since a rear lens frame is divided by the aperture stop, it becomes difficult to maintain precision on decenteration.

Still further, more improved types of the above described lens system are disclosed in U.S. Pat. No. 5,640,277 and U.S. Pat. No. 5,627,686. However, a large number of lens elements are required, and the structure of a lens barrel is complicated, since the aperture stop is arranged to move together with the focusing lens group.

SUMMARY OF THE INVENTION

It is an object of the present invention to provide a rear-focusing telephoto lens system, with a F-number of about 2.8 and with an angle-of-view of about 26°, which can simplify the structure of a lens barrel, and is suitable for an automatic focusing operation.

In order to achieve the above-mentioned object, there is provided a rear-focusing telephoto lens system including a positive front lens group, and a positive rear lens group, in this order from the object. The front lens group includes at least two positive lens elements, each of which has a large-curvature convex surface facing toward the object, and a negative lens element having a large-curvature concave surface facing toward the image. The rear lens group includes at least one lens element which has a convex surface facing toward the object, and is positioned at the most object-side in the rear lens group. Upon focusing, only the rear lens group moves along the optical axis, and the lens system satisfies the following condition:

$$0.5 < f/fF < 0.8 \qquad (1)$$

wherein f designates the focal length of the entire lens system; and fF designates the focal length of the front lens group.

An aperture stop is preferably positioned between the front and rear lens groups so that the aperture stop is made immoveable upon focusing, and the lens system preferably satisfies the following condition:

$$0.23 < d/f < 0.50 \qquad (2)$$

wherein d designates the distance between the front and rear lens groups when the lens system is focused on an object at an infinite photographing distance.

The rear lens group includes a positive lens element having a convex surface facing toward the object, a negative lens element, a negative lens element, and a positive lens element, in this order from the object, and the lens system preferably satisfies the following condition:

$$-0.8 < f/fGr3 < -0.2 \qquad (3)$$

wherein fGr3 designates the focal length of the third lens element, i.e., the second negative lens element, from the object.

On the other hand, the rear lens group can be constituted by three lens elements, i.e., a positive lens element having a convex surface facing toward the object, a negative lens element, and a positive lens element, in this order from the object.

The present disclosure relates to subject matter contained in Japanese Patent Application No. Hei-11-144821 (filed on May 25, 1999) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 1:
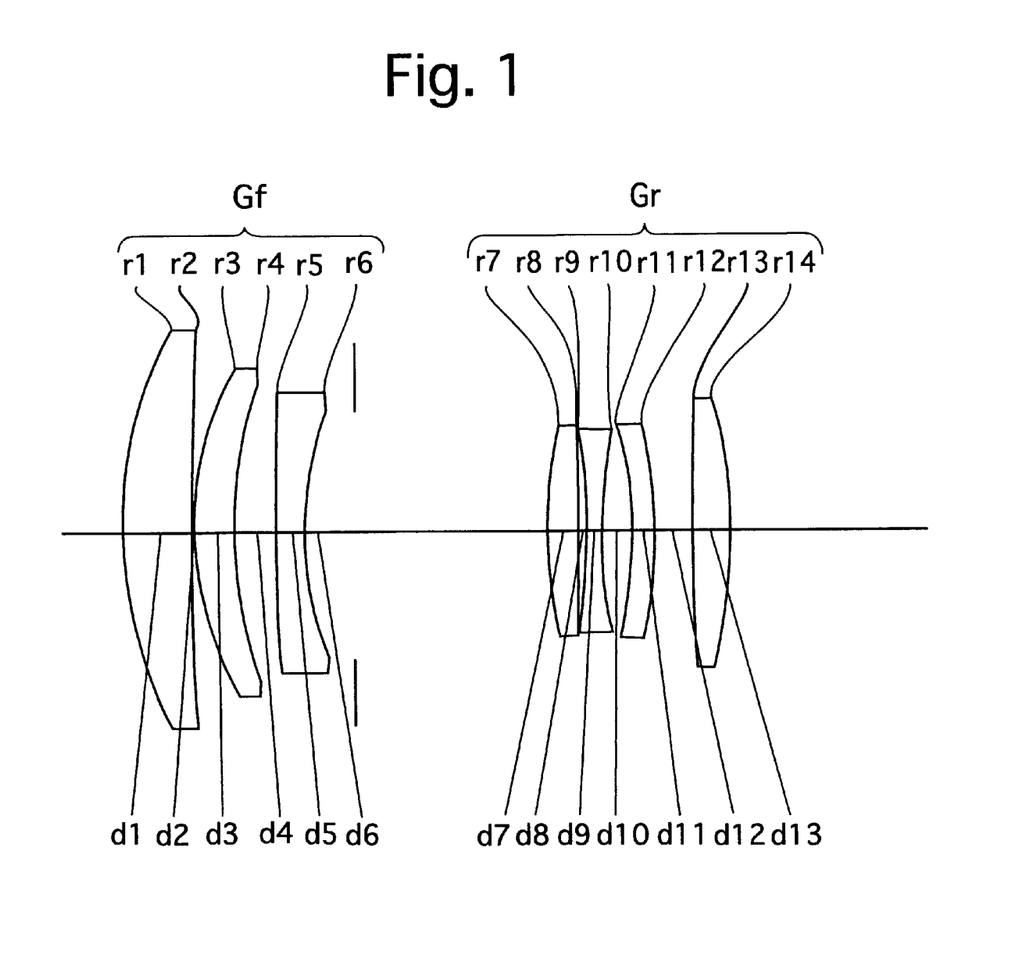
FIG. 1 is a lens arrangement of a first embodiment of a rear-focusing telephoto lens system, according to the present invention, when the lens system is focused on an object at infinite photographing distance.
Figures 2A, 2B:
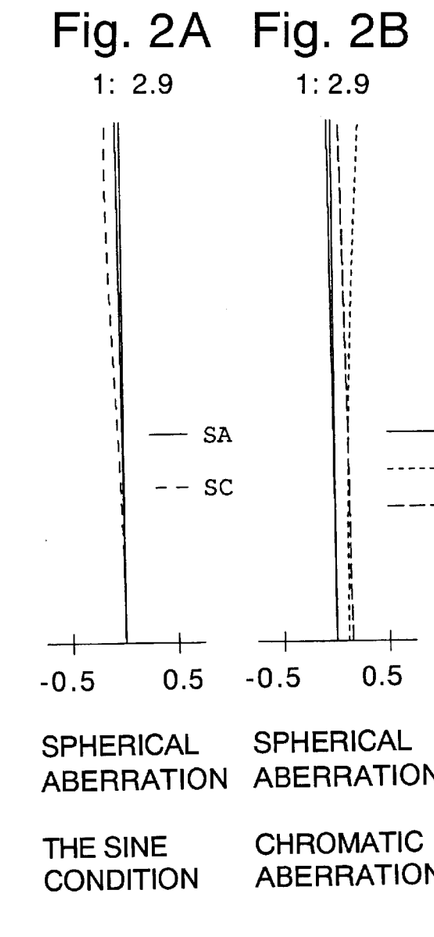
FIGS. 2A, 2B, 2C, 2D and 2E are aberration diagrams of the lens arrangement shown in FIG. 1.
Figure 2C:
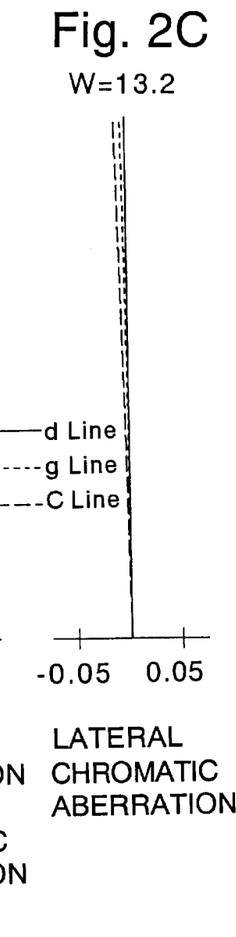
Figure 2D:
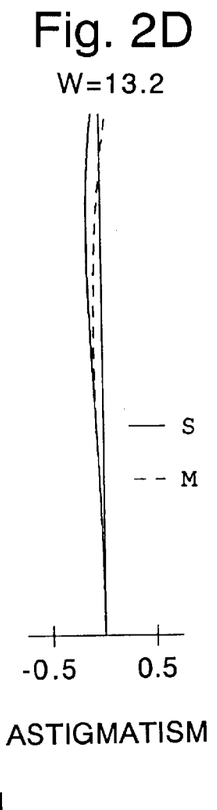
Figure 2E:
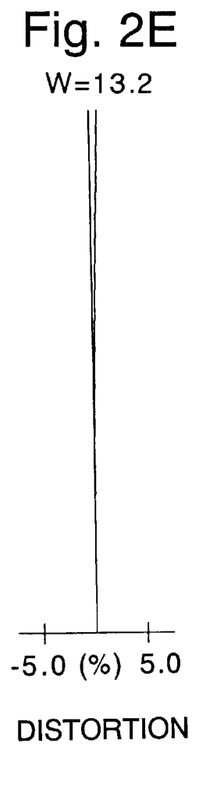
Figures 3A, 3B, 3C:
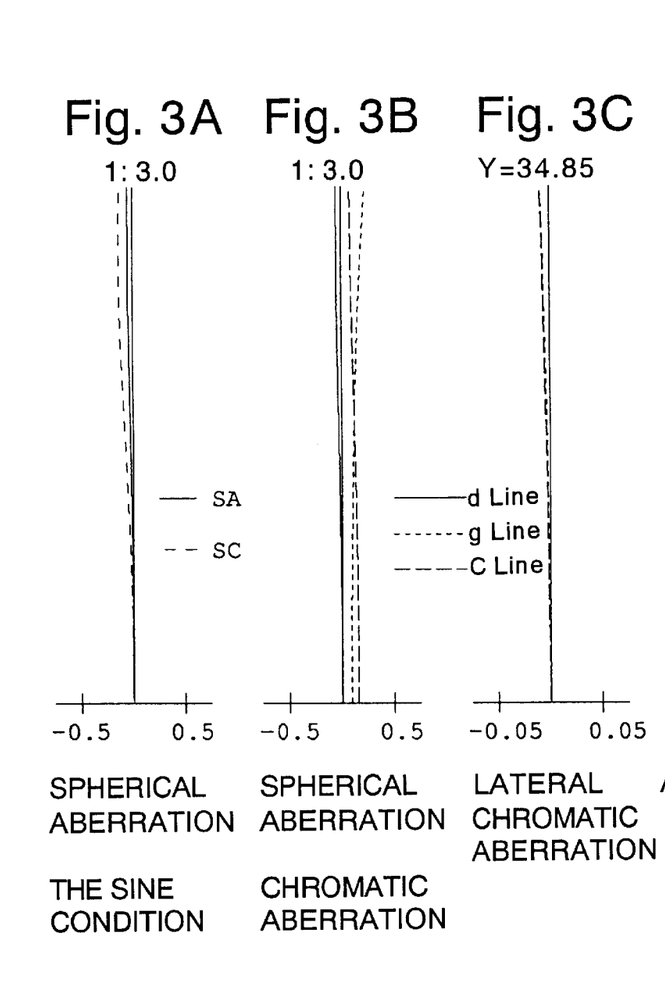
FIGS. 3A, 3B, 3C, 3D and 3E are aberration diagrams of the lens arrangement of the first embodiment at a magnification of −1/40.
Figures 3D, 3E:
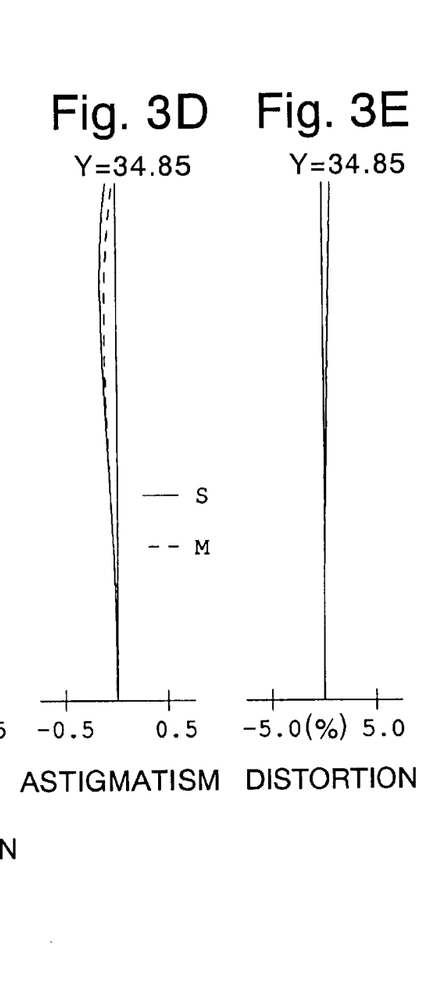
Figure 6:
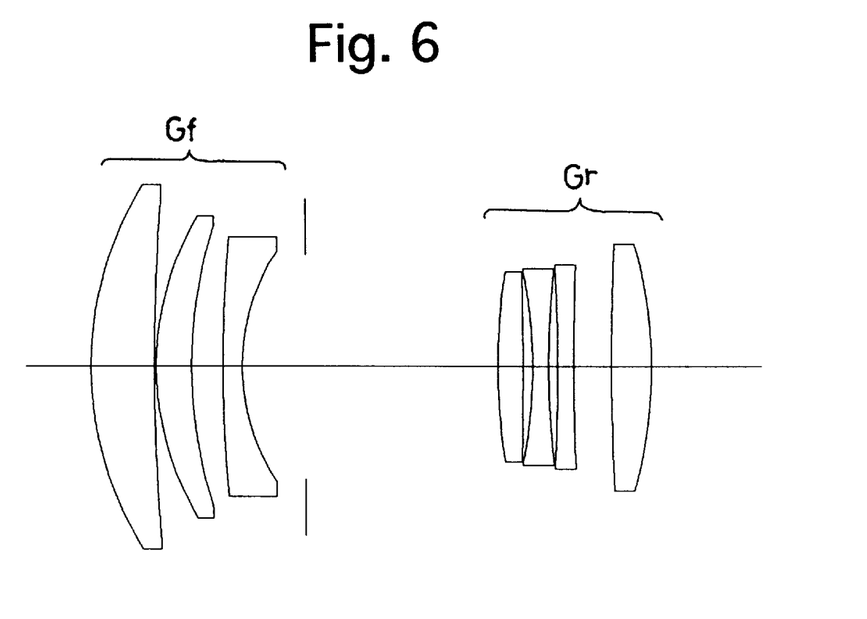
FIG. 6 is a lens arrangement of a second embodiment of a rear-focusing telephoto lens system, according to the present invention, when the lens system is focused on an object at an infinite photographing distance.
Figures 7A, 7B:
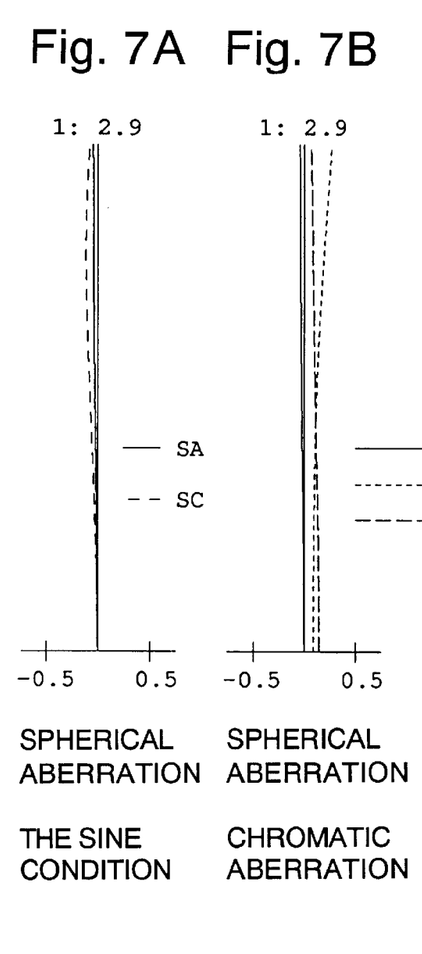
FIGS. 7A, 7B, 7C, 7D and 7E are aberration diagrams of the lens arrangement shown in FIG. 6.
Figure 7C:
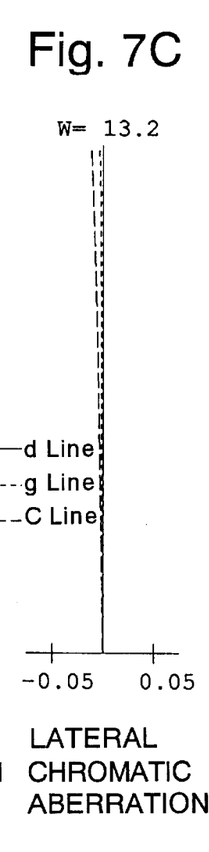
Figure 7D:
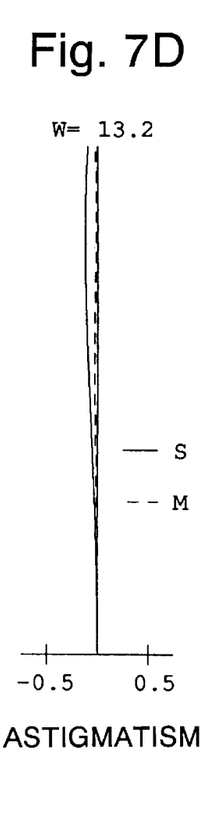
Figure 7E:
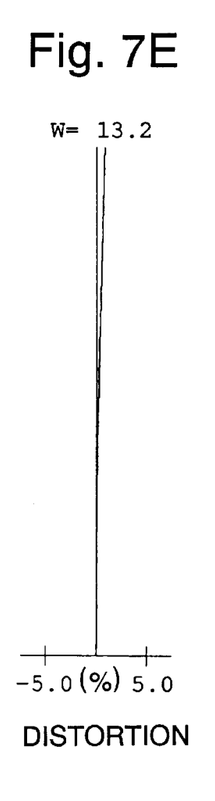
Figure 8A:
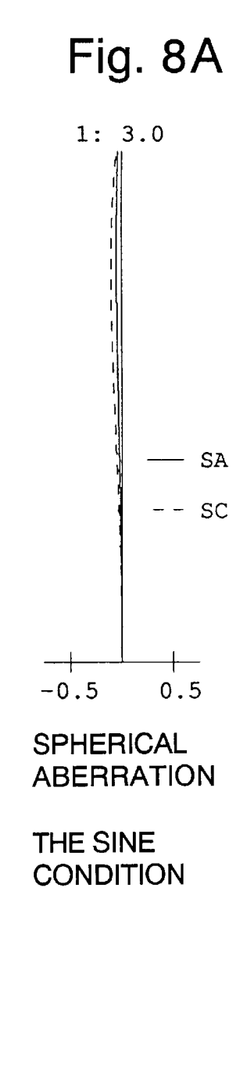
FIGS. 8A, 8B, 8C, 8D and 8E are aberration diagrams of the lens arrangement of the second embodiment at a magnification of −1/40.
Figures 8B, 8C:
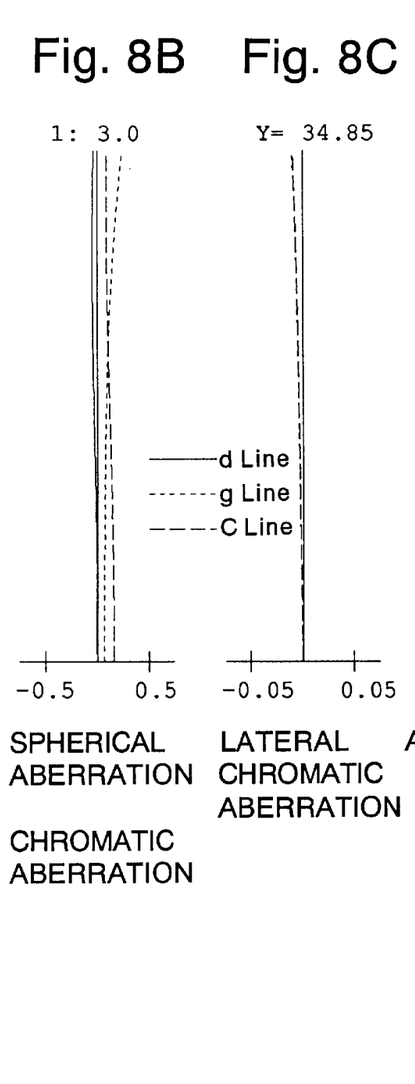
Figure 8D:
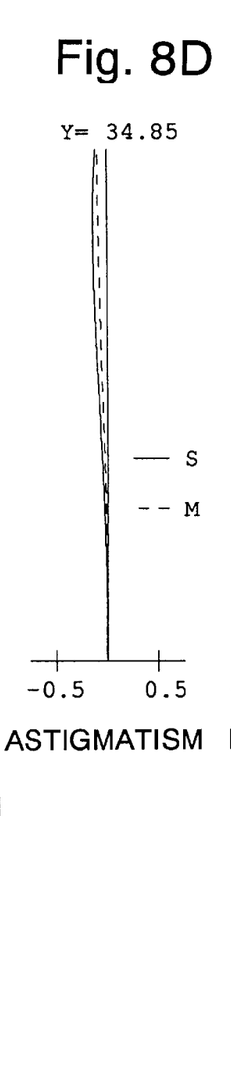
Figure 8E:
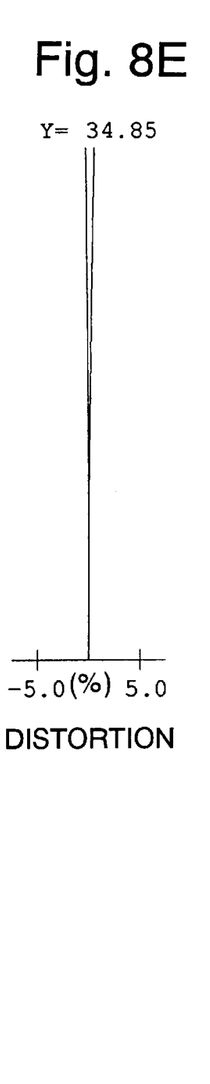
Figure 11:
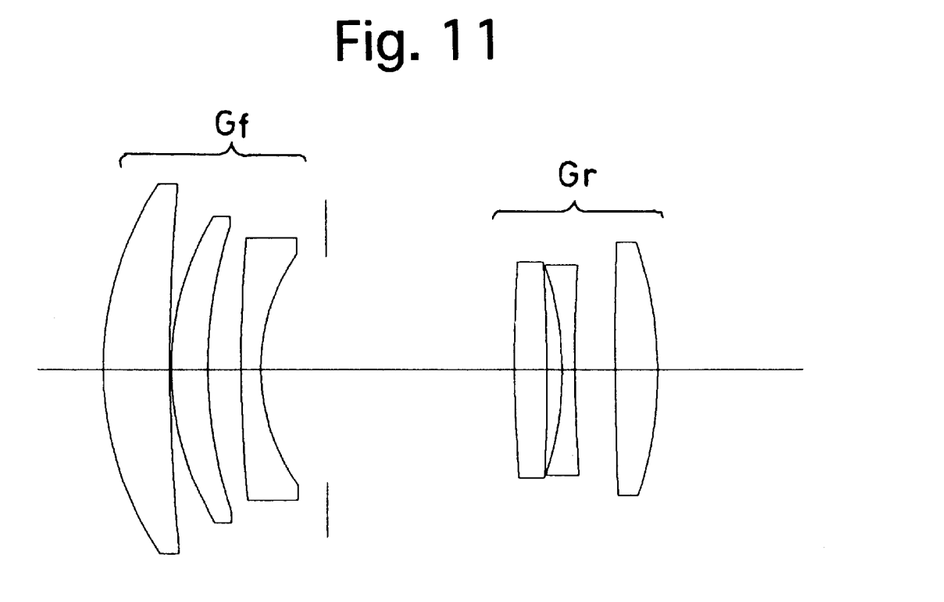
FIG. 11 is a lens arrangement of a third embodiment of a rear-focusing telephoto lens system, according to the present invention, when the lens system is focused an object at an infinite photographing distance.
Figure 12A:
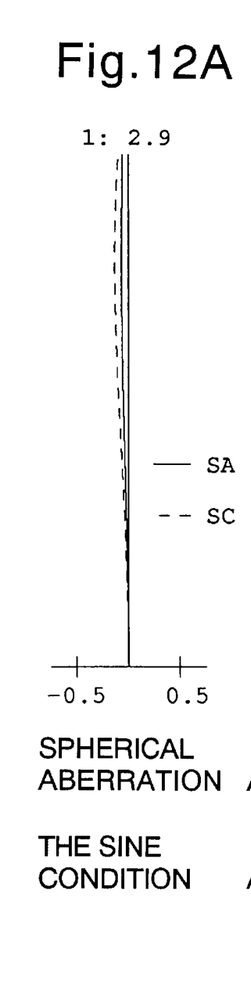
FIGS. 12A, 12B, 12C, 12D and 12E are aberration diagrams of the lens arrangement shown in FIG. 11.
Figure 12B:
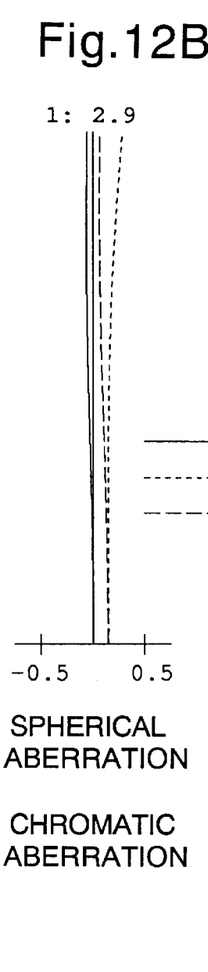
Figure 12C:
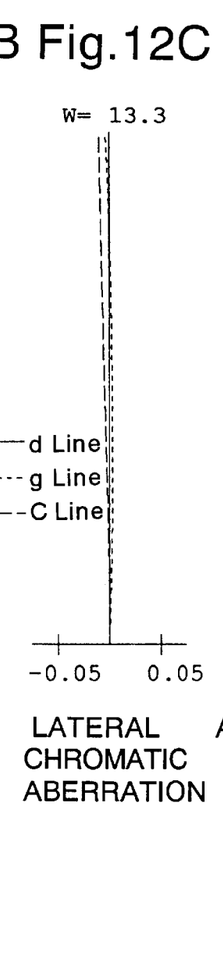
Figure 12D:
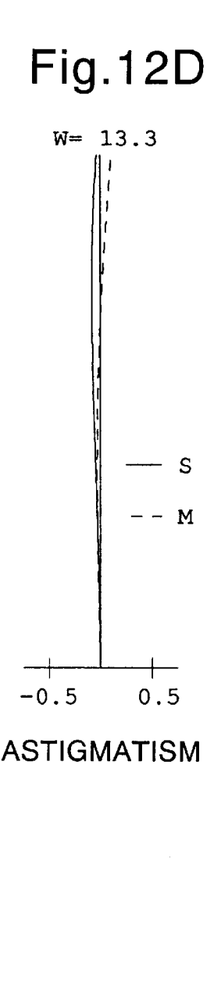
Figure 12E:
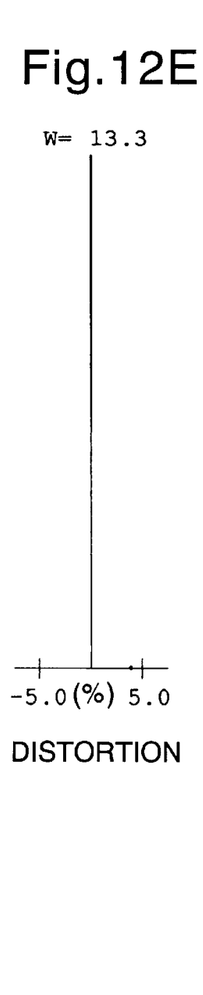
Figure 13A:
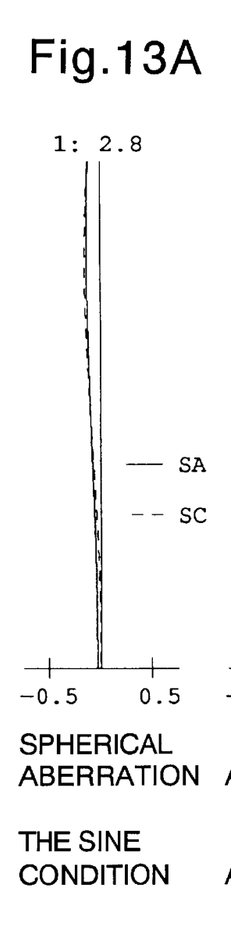
FIGS. 13A, 13B, 13C, 13D and 13E are aberration diagrams of the lens arrangement of the third embodiment at a magnification of −1/40.
Figures 13B, 13C, 13D, 13E:
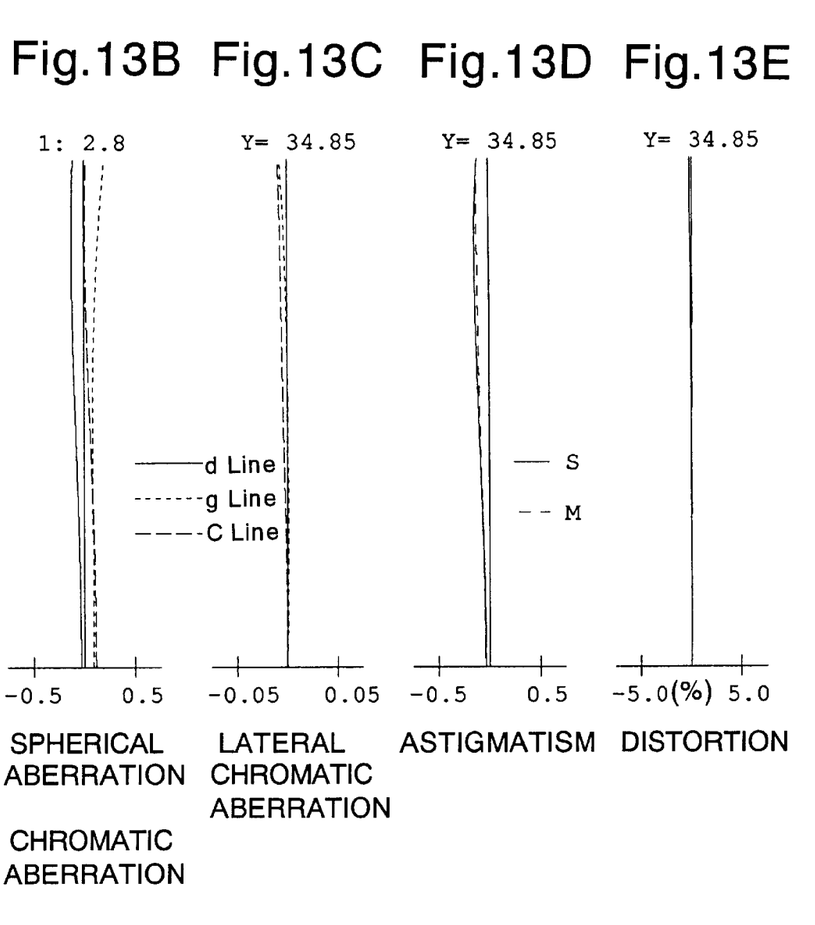

A rear-focusing telephoto lens system, as shown in FIGS. 1, 6 and 11, includes a positive front lens group Gf, and a positive rear lens group Gr, in this order from the object. The front lens group Gf includes two positive lens elements, each of which has a large-curvature convex surface facing toward the object, and a negative lens element having a large-curvature concave surface facing toward the image, in this order from the object. According to the first and second embodiments shown in FIGS. 1 and 6, the rear lens group Gr is constituted by four lens elements, i.e., a positive lens element having a convex surface facing toward the object, a negative lens element, a negative lens element, and a positive lens element, in this order from the object. On the other hand, according to the third embodiment shown in FIG. 11, the rear lens group Gr is constituted by three lens elements, i.e, a positive lens element having a convex surface facing toward the object, a negative lens element, and a positive lens element, in this order from the object. Upon focusing, the front lens group Gf is made immoveable, and only the rear lens group Gr moves along the optical axis. The aperture stop S is provided between the front lens group Gf and the rear lens group Gr, and remains stationary thereat.

Condition (1) specifies the power of the front lens group Gf.

If the power of the front lens group Gf becomes weaker to the extent that f/fF exceeds the lower limit of condition (1), a magnification of the rear lens group Gr is reduced. As a result, the focusing sensitivity on the rear lens group Gr becomes smaller, and a traveling distance of the rear lens group Gr upon focusing increases, and thereby the closest photographing distance cannot be made shorter. On the other hand, if an attempt is made to shorten the closest photographing distance, the overall length of the lens system has to be made longer.

If the power of the front lens group Gf becomes stronger to the extent that f/fF exceeds the upper limit of condition (1), a back focal distance, which is required in a SLR camera and the like, cannot be maintained, and further, a space for providing the aperture stop between the front and rear lens groups cannot be maintained.

Condition (2) specifies the distance between the front and rear lens groups when the lens system is focused on an object at an infinite photographing distance.

If the distance between the front and rear lens groups becomes shorter to the extent that d/f exceeds the lower limit of condition (2), it is difficult to provide the aperture stop between the front and rear lens groups.

If the distance between the front and rear lens groups becomes longer to the extent that d/f exceeds the upper limit of condition (2), the power of the front lens group becomes weaker, since light rays have to be arranged to be incident on the rear lens group at a height, from the optical axis, higher than a predetermined incident height in order to maintain a required back focal distance. Similar to the case where f/fF exceeds the lower limit of condition (1), the focusing sensitivity on the rear lens group Gr becomes smaller.

Condition (3) specifies the power of the third lens element from the object, i.e, the second negative lens element, under the condition that the rear lens group Gr is constituted by four lens elements. As shown in the third embodiment (FIG. 11), the rear lens group Gr can be constituted by the three lens element, i.e, a positive lens element, a negative lens element and a positive lens element. On the other hand, according to the four-lens-element arrangement, field curvature and astigmatic difference are further improved, so that fluctuations of aberrations upon photographing an object at a closer photographing distance can be reduced. In other words, it is understood that a negative lens element with a weaker power, as the so-called field flattener, is added to the lens system of the three-lens-element arrangement. As a result, the Petzval sum can be maintained smaller; and in the rear lens group Gr, field curvature and astigmatism can be reduced. Still further, according to this arrangement, negative spherical aberration due to the negative power can be corrected, so that spherical aberration in the rear lens group Gr can be reduced, and fluctuations of aberrations can be reduced accordingly.

If the power of the third lens element becomes weaker to the extent that f/fGr3 exceeds the lower limit of condition (3), the correcting of spherical aberration and astigmatism cannot be made sufficiently.

If the power of the third lens element becomes stronger to the extent that f/fGr3 exceeds the upper limit of condition (3), negative spherical aberration occurs largely, and the Petzval sum becomes a large positive value.

Specific numerical examples will herein be discussed. In the diagrams of spherical aberration, SA designates spherical aberration, SC designates the sine condition. In the diagrams of chromatic aberration represented by spherical aberration, the solid line and the two types of dotted lines respectively indicate spherical aberration with respect to the d, g and C lines. Also, in the diagrams of lateral chromatic aberration, the solid line and the two types of dotted lines respectively indicate magnification with respect to the d, g and C lines. S designates the sagittal image, M designates the meridional image, and Y designates the image height. In the tables, $F_{NO}$ designates the F-number, f designates the focal length of the entire lens system, W designates the half angle-of-view (°), $f_B$ designates the back focal distance, m designates the magnification, r designates the radius of curvature, d designates the lens thickness or space between lens surfaces, $N_d$ designates the refractive index of the d line, and v designates the Abbe number.

Figure 4:
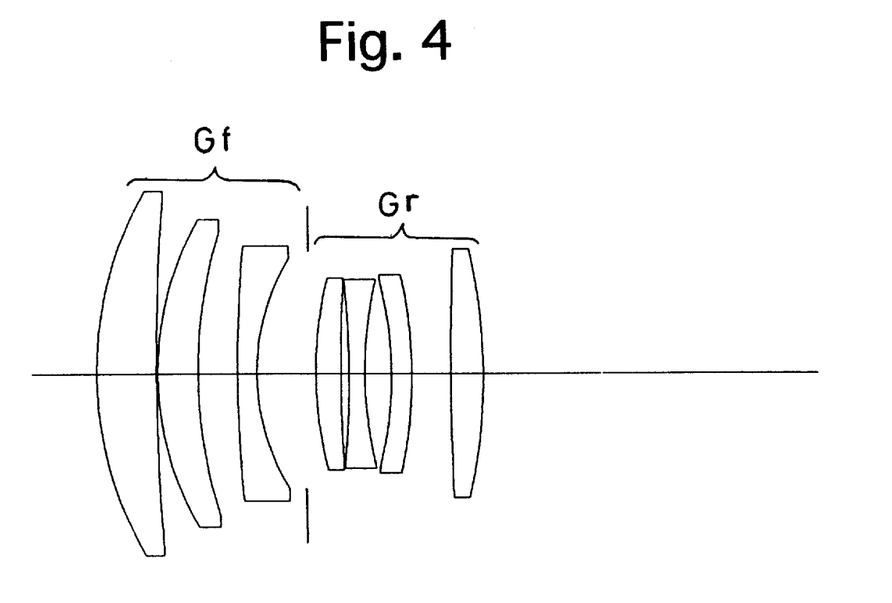
FIG. 4 is a lens arrangement of the first embodiment of the rear-focusing telephoto lens system, when the lens system is focused on an object at the closest photographing distance.
Figure 5A:
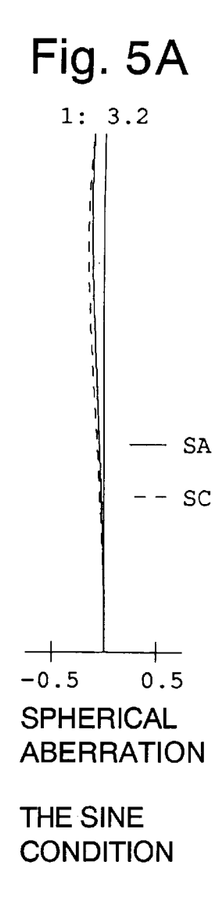
FIGS. 5A, 5B, 5C, 5D and 5E are aberration diagrams of the lens arrangement shown in FIG. 4.
Figure 5B:
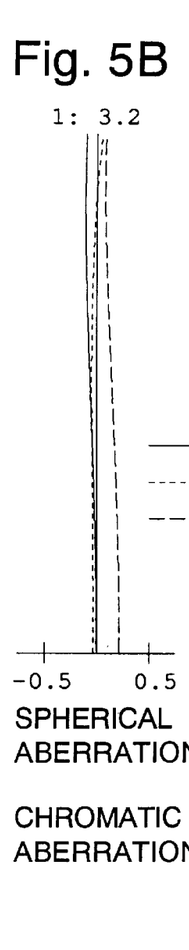
Figure 5C:
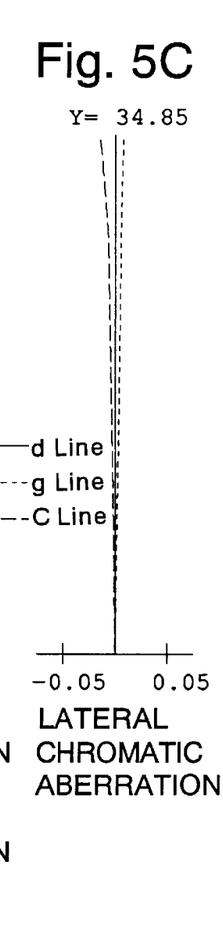
Figure 5D:
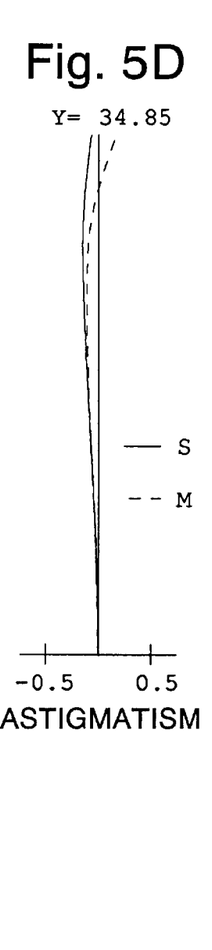
Figure 5E:
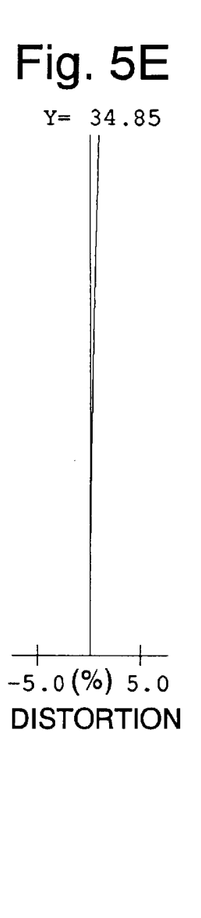

FIG. 1 is the lens arrangement of the first embodiment of the rear-focusing telephoto lens system, when the lens system is focused on an object at an infinite photographing distance; and FIG. 4 shows the above rear-focusing telephoto lens system when the lens system is focused on an object at the closest photographing distance. FIGS. 2A through 2E are aberration diagrams of the lens arrangement shown in FIG. 1. FIGS. 3A through 3E are aberration diagrams of the lens arrangement of the first embodiment at a magnification of −1/40. FIGS. 5A through 5E are aberration diagrams of the lens arrangement shown in FIG. 4. Table 1 shows the numerical data of the first embodiment. Surface Nos.1 through 6 represent the front lens group Gf, and surface Nos.7 through 14 represent the rear lens group Gr. The front lens group Gf includes two positive lens elements, each of which has a large-curvature convex surface facing toward the object, and a negative lens element having a large-curvature concave surface facing toward the image, in this order from the object. The rear lens group Gr is constituted by four lens elements, i.e, a positive lens element having a convex surface facing toward the object, a negative lens element, a negative lens element, and a positive lens element, in this order from the object. The aperture stop S is maintained stationary between the front lens group Gf and the rear lens group Gr.

TABLE 1

|  | Infinite Photo. Distance | Magnification −1/40 | The Closest Photo.Distance |
|---|---|---|---|
| $f_B=$ | 77.08 | 82.26 | 104.52 |
| m= | 0.000 | −0.025 | −0.147 |
| f= | 147.00 | | |
| $F_{NO}=$ | 1:2.9 | | |
| W= | 13.2 | | |

| Surface No. | r | d | Nd | v |
|---|---|---|---|---|
| 1 | 58.699 | 9.24 | 1.72916 | 54.7 |
| 2 | 347.419 | 0.20 | — | — |
| 3 | 49.145 | 6.31 | 1.61800 | 63.4 |
| 4 | 75.376 | 6.16 | — | — |
| 5 | 212.170 | 3.00 | 1.66680 | 33.0 |
| 6 | 34.710 | 8.02 | — | — |
| Aperture Stop | ∞ | 28.65-23.46-1.20 | — | — |
| 7 | 62.065 | 3.93 | 1.80400 | 46.6 |
| 8 | 283.420 | 1.23 | — | — |
| 9 | −159.424 | 2.50 | 1.64769 | 33.8 |
| 10 | 62.995 | 4.18 | — | — |
| 11 | −59.068 | 3.18 | 1.84666 | 23.8 |
| 12 | −72.798 | 6.13 | — | — |
| 13 | 444.298 | 5.09 | 1.83400 | 37.2 |
| 14 | −86.179 | — | — | — |

EMBODIMENT 2

Figure 9:
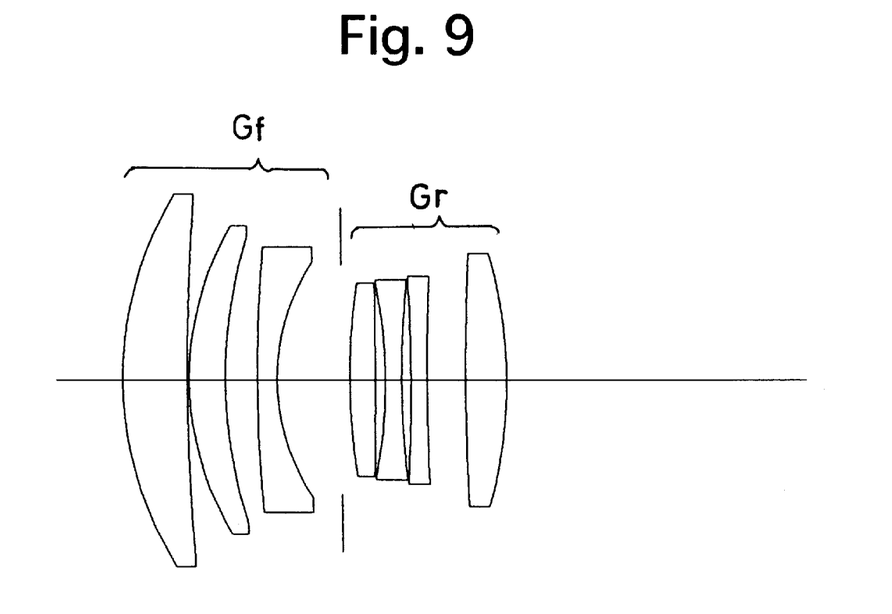
FIG. 9 is a lens arrangement of the second embodiment of the rear-focusing telephoto lens system, when the lens system is focused on an object at the closest photographing distance.
Figure 10A:
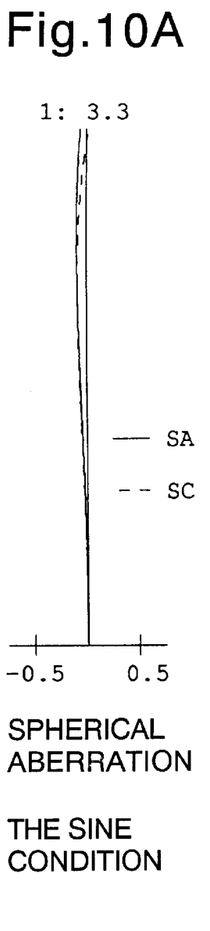
FIGS. 10A, 10B, 10C, 10D and 10E are aberration diagrams of the lens arrangement shown in FIG. 9.
Figure 10B:
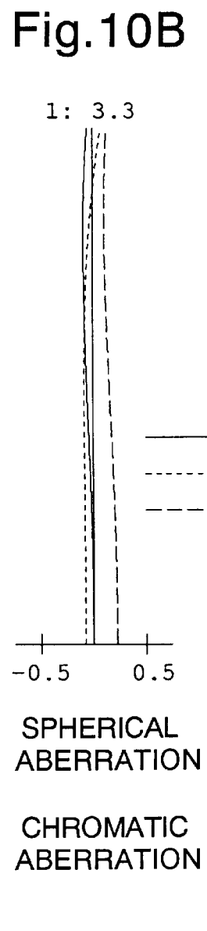
Figure 10C:
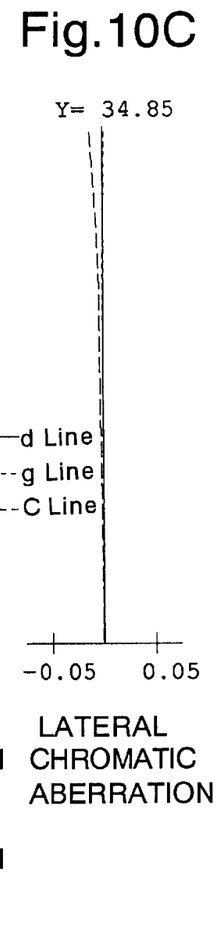
Figure 10D:
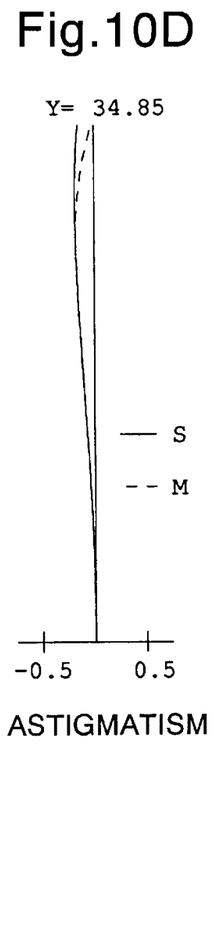
Figure 10E:
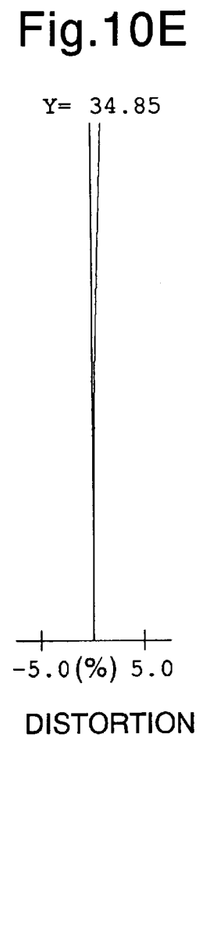

FIG. 6 is the lens arrangement of the second embodiment of the rear-focusing telephoto lens system when the lens system is focused on an object at an infinite photographing distance; and FIG. 9 shows the above rear-focusing telephoto lens system when the lens system is focused on an object at the closest photographing distance. FIG. 7A through 7E are aberration diagrams of the lens arrangement shown in FIG. 6. FIG. 8A through 8E are aberration diagrams of the lens arrangement of the second embodiment at a magnification of −1/40. FIGS. 10A through 10E are aberration diagrams of the lens arrangement shown in FIG. 9. Table 2 shows the numerical data of the second embodiment. The basic lens arrangement is the same as the first embodiment.

TABLE 2

|  | Infinite Photo. Distance | Magnification −1/40 | The Closest Photo.Distance |
|---|---|---|---|
| $f_B=$ | 76.37 | 81.99 | 105.33 |
| m= | 0.000 | −0.025 | −0.145 |
| f= | 147.97 | | |
| $F_{NO}=$ | 1:2.9 | | |
| W= | 13.2 | | |

| Surface No. | r | d | Nd | v |
|---|---|---|---|---|
| 1 | 55.096 | 9.81 | 1.72916 | 54.7 |
| 2 | 344.587 | 0.31 | — | — |
| 3 | 47.000 | 5.51 | 1.61800 | 63.4 |
| 4 | 73.350 | 4.90 | — | — |
| 5 | 228.536 | 3.00 | 1.64769 | 33.8 |
| 6 | 32.889 | 9.94 | — | — |
| Aperture Stop | ∞ | 30.18-24.56-1.22 | — | — |
| 7 | 100.590 | 3.92 | 1.80400 | 46.6 |
| 8 | −1020.662 | 1.56 | — | — |
| 9 | −75.545 | 2.50 | 1.67270 | 32.1 |
| 10 | 140.152 | 1.45 | — | — |
| 11 | −263.618 | 2.50 | 1.64769 | 33.8 |
| 12 | 382.905 | 5.94 | — | — |
| 13 | 380.579 | 6.31 | 1.83400 | 37.2 |
| 14 | −72.136 | — | — | — |

EMBODIMENT 3

Figure 14:
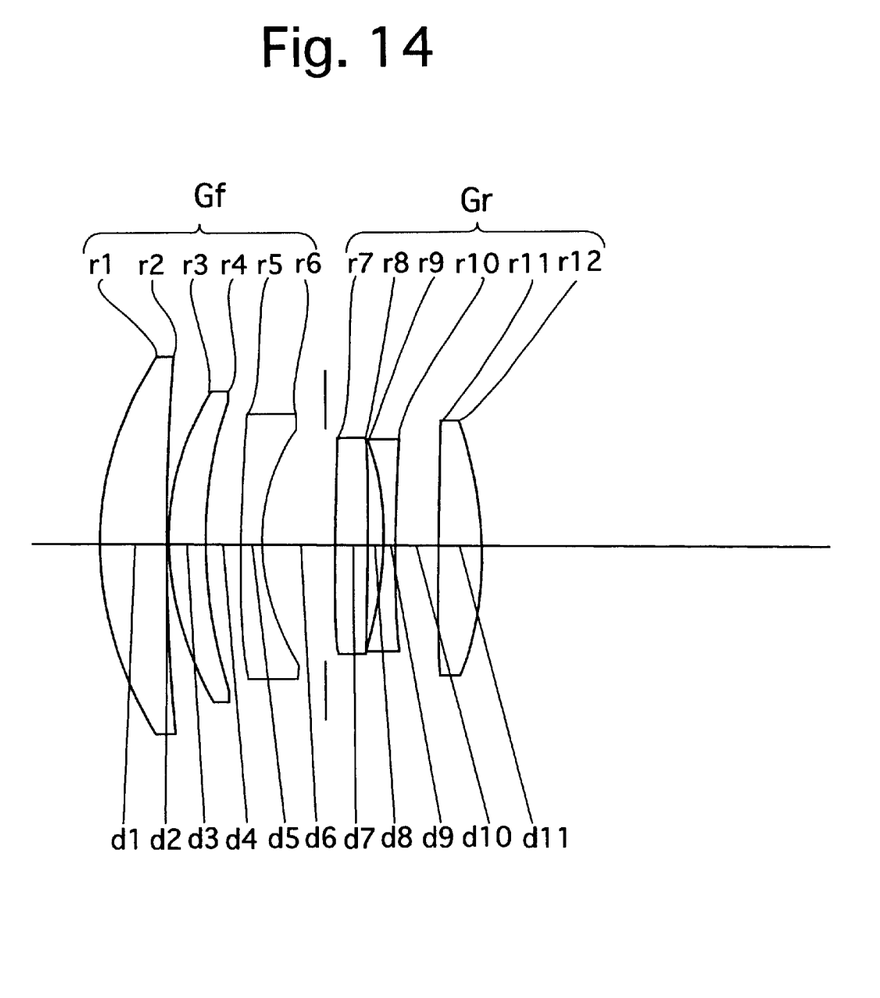
FIG. 14 is a lens arrangement of the third embodiment of the rear-focusing telephoto lens system, when the lens system is focused on an object at the closest photographing distance.
Figure 15A:
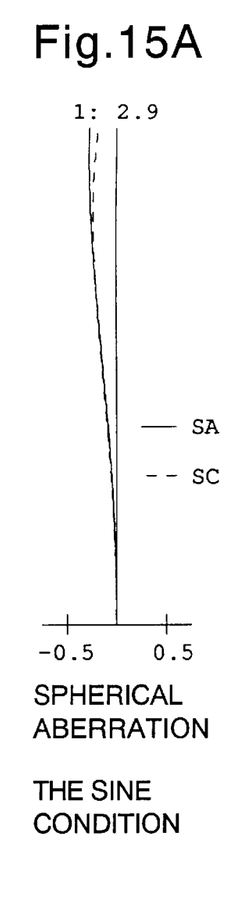
FIGS. 15A, 15B, 15C, 15D and 15E are aberration diagrams of the lens arrangement shown in FIG. 14.
Figure 15B:
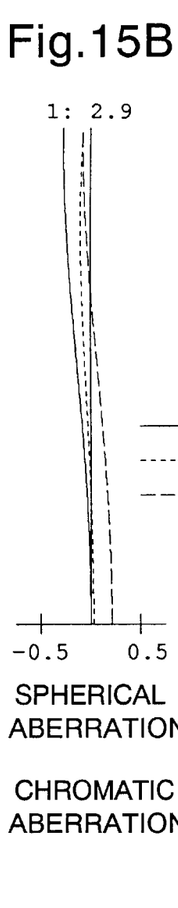
Figure 15C:
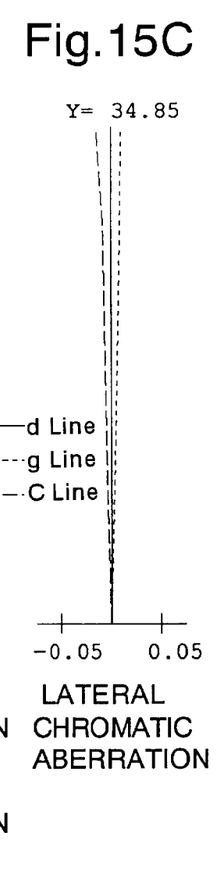
Figure 15D:
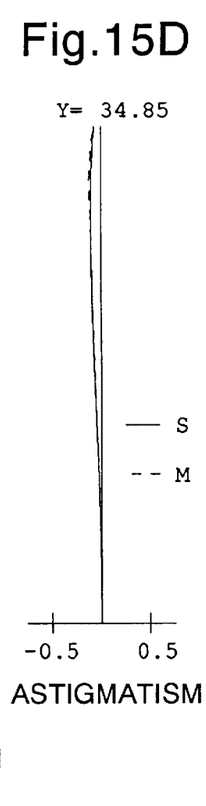
Figure 15E:
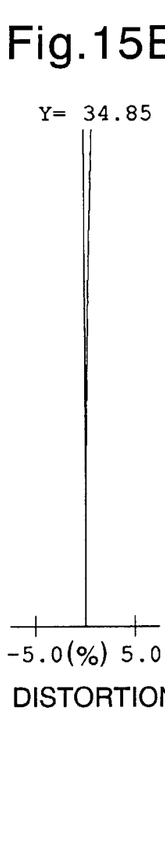

FIG. 11 is the lens arrangement of the third embodiment of the rear-focusing telephoto lens system when the lens system is focused on an object at an infinite photographing distance; and FIG. 14 shows the above rear-focusing telephoto lens system when the lens system is focused on an object at the closest photographing distance. FIG. 12A through 12E are aberration diagrams of the lens arrangement shown in FIG. 11. FIG. 13A through 13E are aberration diagrams of the lens arrangement of the third embodiment at a magnification of −1/40. FIGS. 15A through 15E are aberration diagrams of the lens arrangement shown in FIG. 14. Table 3 shows the numerical data of the third embodiment. Surface Nos.1 through 6 represent the front lens group Gf, and surface Nos. 7 through 12 represent the rear lens group Gr. The front lens group Gf includes two positive lens elements, each of which has a large-curvature convex surface facing toward the object, and a negative lens element having a large-curvature concave surface facing toward the image,in this order from the object. The rear lens group Gr is constituted by three lens elements, i.e, a positive lens element having a convex surface facing toward the object side, a negative lens element, and a positive lens element, in this order from the object. The aperture stop S is maintained stationary between the front lens group Gf and the rear lens group Gr.

TABLE 3

|  | Infinite Photo. Distance | Magnification −1/40 | The Closest Photo.Distance |
| --- | --- | --- | --- |
| $f_B$= | 79.40 | 84.73 | 107.12 |
| m= | 0.000 | −0.025 | −0.146 |
| f= | 146.93 | | |
| $F_{NO}$= | 1:2.9 | | |
| W= | 13.3 | | |

| Surface No. | r | d | Nd | ν |
| --- | --- | --- | --- | --- |
| 1 | 52.387 | 10.08 | 1.72916 | 54.7 |
| 2 | 298.000 | 0.24 | — | — |
| 3 | 45.946 | 5.51 | 1.61800 | 63.4 |
| 4 | 70.508 | 5.09 | — | — |
| 5 | 229.782 | 3.00 | 1.64769 | 33.8 |
| 6 | 31.120 | 10.08 | — | — |
| Aperture Stop | ∞ | 28.93-23.72-1.20 | — | — |
| 7 | 228.837 | 5.04 | 1.80400 | 46.6 |
| 8 | −317.405 | 2.39 | — | — |
| 9 | −50.887 | 2.00 | 1.69895 | 30.1 |
| 10 | 256.227 | 6.22 | — | — |
| 11 | 564.330 | 6.59 | 1.83400 | 37.2 |
| 12 | −60.462 | — | — | — |

Table 4 shows the numerical values of each condition of each embodiment.

TABLE 4

|  | Embod. 1 | Embod. 2 | Embod. 3 |
| --- | --- | --- | --- |
| Condition (1) | 0.556 | 0.605 | 0.574 |
| Condition (2) | 0.249 | 0.273 | 0.265 |
| Condition (3) | −0.355 | −0.611 | — |

As can be understood from Table 4, each embodiment satisfies each condition. Furthermore, as can be understood from the aberration diagrams, the various aberrations are adequately corrected.

According to the present invention, a rear-focusing telephoto lens system having the following features can be obtained:

a F-number of about 2.8;

an angle-of-view of about 26°;

a lens barrel with a simplified structure, and being suitable for an automatic focusing operation.

What is claimed is:

1. A rear-focusing telephoto lens system comprising a positive front lens group, and a positive rear lens group, in this order from an object;

wherein said front lens group comprises at least two positive lens elements, each of which has a large-curvature convex surface facing toward said object, and a negative lens element having a large-curvature concave surface facing toward an image;

wherein said rear lens group comprises at least one lens element which has a convex surface facing toward said object, and is positioned at the most object-side in said rear lens group; and wherein upon focusing, only said rear lens group moves along the optical axis, and said lens system satisfies the following condition:

$0.5 < f/fF < 0.8$ wherein f designates the focal length of the entire lens system; and fF designates the focal length of said front lens group.

2. The rear-focusing telephoto lens system according to claim 1, further comprising an aperture stop which is provided between said front lens group and said rear lens group, and which is made immoveable upon focusing; and wherein said lens system satisfies the following condition:

$0.23 < d/f < 0.50$ wherein d designates the distance between said front and rear lens groups when said lens system is focused on an object at an infinite photographing distance.

3. The rear-focusing telephoto lens system according to claim 1, wherein said rear lens group comprises a positive lens element having a convex surface facing toward said object, a negative lens element, a negative lens element, and a positive lens element, in this order from said object; and wherein said lens system satisfies the following condition:

$-0.8 < f/fGr3 < -0.2$ wherein fGr3 designates the focal length of a third lens element in said rear lens group, said third lens element being said second negative lens element from said object.

4. The rear-focusing telephoto lens system according to claim 1, wherein said rear lens group comprises a positive lens element having a convex surface facing toward said object, a negative lens element, and a positive lens element, in this order from said object.

* * * * *